(12) United States Patent
Hong et al.

(10) Patent No.: US 11,684,874 B2
(45) Date of Patent: Jun. 27, 2023

(54) TANGENTIAL FLOW FILTRATION MODULE AND TANGENTIAL FLOW FILTRATION ASSEMBLY

(71) Applicant: METAL INDUSTRIES RESEARCH & DEVELOPMENT CENTRE, Kaohsiung (TW)

(72) Inventors: Zheng-Han Hong, Tainan (TW); Chun-Mu Wu, Kaohsiung (TW); Zong-Hsin Liu, Kaohsiung (TW); Po-Han Tseng, Kaohsiung (TW); Yao-Kun Haung, Taoyuan (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 283 days.

(21) Appl. No.: 17/136,050

(22) Filed: Dec. 29, 2020

(65) Prior Publication Data
US 2022/0203272 A1    Jun. 30, 2022

(51) Int. Cl.
*B01D 29/46*    (2006.01)
(52) U.S. Cl.
CPC ........ *B01D 29/46* (2013.01); *B01D 2201/186* (2013.01); *B01D 2201/202* (2013.01); *B01D 2201/4038* (2013.01)
(58) Field of Classification Search
None
See application file for complete search history.

(56) References Cited

U.S. PATENT DOCUMENTS

| 1,555,574 | A | * | 9/1925 | Herrmann | B01D 25/26 210/488 |
| 1,646,404 | A | * | 10/1927 | Herbert | B01D 25/001 210/488 |
| 1,677,892 | A | * | 7/1928 | Herbert | B01D 29/46 210/488 |
| 1,688,326 | A | * | 10/1928 | Boulade | B01D 29/46 210/444 |

(Continued)

FOREIGN PATENT DOCUMENTS

| CN | 1232411 A | 10/1999 |
| DE | 19813174 A1 | 5/1999 |

(Continued)

*Primary Examiner* — Robert J Popovics
(74) *Attorney, Agent, or Firm* — CKC & Partners Co., LLC (57) ABSTRACT

A tangential flow filtration module includes plural plate units connected in sequence. Each of the plate units includes a main body, a first combing portion, a second combing portion, a first flange and a second flange. The main body has a first side surface, a second side surface and a through hole. The first side surface is opposite to the second side surface, and the through hole extends from the first side surface to the second side surface. The first combing portion and the second combing portion are disposed on the first side surface and the second side surface respectively. The first flange and the second flange respectively protrude from the first side surface and the second side surface and respectively. The first combing portion of one of the plate units is combined with the second combing portion of another one of the plate units, so that a sieving structure.

9 Claims, 5 Drawing Sheets

(56) References Cited

U.S. PATENT DOCUMENTS

| | | | | |
|---|---|---|---|---|
| 1,797,399 A * | 3/1931 | Boulade | B01D 29/15 | 210/488 |
| 1,804,512 A * | 5/1931 | Pickard | B01D 29/46 | 210/440 |
| 1,852,873 A * | 4/1932 | Berger | B01D 29/46 | 210/357 |
| 2,159,196 A * | 5/1939 | Babitch | B01D 35/005 | 210/488 |
| 2,330,945 A * | 10/1943 | Becker | B01D 29/46 | 210/488 |
| 2,365,525 A * | 12/1944 | Cox | B01D 25/34 | 210/357 |
| 2,382,278 A * | 8/1945 | Widmann | B01D 29/114 | 210/488 |
| 2,436,108 A * | 2/1948 | Heftler | B01D 29/46 | 210/488 |
| 2,440,384 A * | 4/1948 | Schenke | B01D 29/6476 | 210/415 |
| 2,455,486 A * | 12/1948 | Hicks | B01D 29/46 | 210/442 |
| 2,519,506 A * | 8/1950 | Russell | B01D 25/24 | 210/486 |
| 2,569,748 A * | 10/1951 | De Grave | B01D 29/606 | 210/90 |
| 2,575,995 A * | 11/1951 | Briggs | B01D 29/46 | 210/442 |
| 2,581,337 A * | 1/1952 | Lapik | B01D 29/46 | 210/488 |
| 2,699,261 A * | 1/1955 | Stowe | B01D 29/46 | 210/488 |
| 2,702,637 A * | 2/1955 | Shepard | B01D 29/15 | 210/434 |
| 2,746,552 A * | 5/1956 | Grospas | E21B 43/08 | 166/235 |
| 2,757,802 A * | 8/1956 | Schmid | B01D 29/416 | 210/237 |
| 2,792,122 A * | 5/1957 | Munch | D01D 1/106 | 210/489 |
| 2,855,106 A * | 10/1958 | English | B01D 29/70 | 210/488 |
| 3,034,656 A * | 5/1962 | Kasten | B01D 29/33 | 73/61.61 |
| 3,037,633 A * | 6/1962 | Veitel | B01D 29/46 | 210/488 |
| 3,111,963 A * | 11/1963 | Brockwell | F16C 33/1055 | 29/896.62 |
| 3,152,988 A * | 10/1964 | Gutkowski | B01D 29/46 | 210/488 |
| 3,195,730 A * | 7/1965 | Muller | B01D 29/46 | 210/488 |
| 3,214,368 A * | 10/1965 | Muller | B01D 17/045 | 210/488 |
| 3,273,374 A * | 9/1966 | Annett | B01D 29/46 | 210/488 |
| 3,319,795 A * | 5/1967 | Schmidli | B01D 29/46 | 210/457 |
| 3,360,133 A * | 12/1967 | Proulx | B01D 36/003 | 55/482 |
| 3,397,794 A * | 8/1968 | Toth | B01D 21/0039 | 210/488 |
| 3,398,673 A * | 8/1968 | Koplock | B01D 29/46 | 210/167.28 |
| 3,425,563 A * | 2/1969 | Wilansky | B01D 29/46 | 210/492 |
| 3,473,668 A * | 10/1969 | Bunyard | B01D 29/46 | 210/492 |
| 3,522,530 A * | 8/1970 | Muller | G01N 27/048 | 324/695 |
| 3,568,845 A * | 3/1971 | Llamas | B01D 29/46 | 210/488 |
| 3,578,176 A * | 5/1971 | Cuyler | B01D 29/46 | 210/492 |
| 3,622,003 A * | 11/1971 | Czech | B01D 29/70 | 210/488 |
| 3,647,084 A * | 3/1972 | Martin | B01D 25/26 | 210/488 |
| 3,648,843 A * | 3/1972 | Pearson | B01D 29/46 | 210/488 |
| 3,812,972 A * | 5/1974 | Rosenblum | B01D 25/001 | 210/489 |
| 3,827,568 A * | 8/1974 | Toth | B01D 29/46 | 210/488 |
| 4,115,274 A * | 9/1978 | Boddeker | B01D 63/082 | 210/488 |
| 4,123,356 A * | 10/1978 | Sugimoto | B01D 29/74 | 210/411 |
| 4,239,728 A * | 12/1980 | Stenberg | B01D 63/082 | 422/46 |
| 4,267,045 A * | 5/1981 | Hoof | B01D 29/46 | 210/488 |
| 4,280,907 A * | 7/1981 | Haberle | B29C 48/6945 | 425/197 |
| 4,358,370 A * | 11/1982 | Jameson | B01D 29/15 | 210/485 |
| 4,384,975 A | 5/1983 | Fong | | |
| 4,389,330 A | 6/1983 | Tice et al. | | |
| 4,402,829 A * | 9/1983 | Cordua | B01D 25/34 | 210/488 |
| 4,410,430 A * | 10/1983 | Hagler, Jr. | B01D 29/46 | 210/488 |
| 4,430,218 A * | 2/1984 | Perl | B01D 61/28 | 210/450 |
| 4,430,232 A * | 2/1984 | Doucet | B01D 29/66 | 210/488 |
| 4,517,089 A * | 5/1985 | Arnaud | B01D 29/46 | 210/488 |
| 4,552,655 A * | 11/1985 | Granot | B01D 29/70 | 210/488 |
| 4,565,628 A * | 1/1986 | Arnaud | B01D 29/46 | 210/488 |
| 4,592,838 A * | 6/1986 | Christophe | B01D 29/682 | 210/345 |
| 4,592,839 A * | 6/1986 | Rosenberg | B01D 29/46 | 210/488 |
| 4,661,250 A * | 4/1987 | Rosenberg | B01D 29/46 | 210/411 |
| 4,686,038 A * | 8/1987 | Arnaud | B01D 29/46 | 210/450 |
| 4,707,258 A * | 11/1987 | Drori | B01D 25/327 | 210/333.1 |
| 4,726,900 A * | 2/1988 | Keskinen | B01D 29/46 | 210/488 |
| 4,744,901 A * | 5/1988 | Drori | B01D 29/46 | 210/488 |
| 4,753,731 A * | 6/1988 | Drori | B01D 29/46 | 210/488 |
| 4,764,186 A * | 8/1988 | Langer | G01N 1/2205 | 95/278 |
| 4,793,928 A * | 12/1988 | Tsukamoto | B29B 13/10 | 210/488 |
| 4,844,806 A * | 7/1989 | Drori | B01D 29/46 | 210/488 |
| 4,871,457 A * | 10/1989 | Drori | B01D 25/34 | 210/333.1 |
| 4,880,537 A * | 11/1989 | Drori | B01D 29/46 | 210/488 |
| 4,935,136 A * | 6/1990 | Drori | B01D 25/34 | 210/333.1 |
| 5,015,381 A * | 5/1991 | Ellion | B01D 46/40 | 96/392 |
| 5,037,548 A * | 8/1991 | Rosenberg | B01D 29/114 | 210/488 |
| 5,122,271 A * | 6/1992 | Simon | B01D 29/15 | 210/488 |
| 5,232,589 A * | 8/1993 | Kopf | C12M 25/04 | 210/231 |
| 5,249,626 A * | 10/1993 | Gibbins | E21B 43/088 | 210/488 |

(56) References Cited

U.S. PATENT DOCUMENTS

| | | | | |
|---|---|---|---|---|
| 5,387,340 | A * | 2/1995 | Ackerman | B01J 8/22 29/896.62 |
| 5,500,122 | A * | 3/1996 | Schwartz | B01D 63/082 210/232 |
| 5,520,807 | A * | 5/1996 | Myrna | B01D 63/084 210/488 |
| 5,536,405 | A * | 7/1996 | Myrna | B01D 65/00 210/231 |
| 5,711,877 | A * | 1/1998 | Gonzalez | B01D 29/15 210/488 |
| 6,062,392 | A * | 5/2000 | Birmingham | B01D 45/08 95/32 |
| 6,209,728 | B1 * | 4/2001 | Maeda | B01D 29/70 210/488 |
| 6,391,097 | B1 * | 5/2002 | Rosenberg | B01D 29/46 96/87 |
| 6,398,037 | B1 * | 6/2002 | Sadan | B01D 29/70 210/488 |
| 6,419,826 | B1 * | 7/2002 | Lara | B01D 29/70 210/488 |
| 6,698,592 | B2 * | 3/2004 | Kenning | G01N 1/2273 209/143 |
| 7,192,528 | B2 * | 3/2007 | Prochaska | B01D 29/46 210/350 |
| 7,210,585 | B2 * | 5/2007 | Hajek | B01D 29/35 210/488 |
| 7,241,383 | B2 * | 7/2007 | Katano | B01D 29/66 210/411 |
| 7,316,780 | B1 * | 1/2008 | Fendya | B01D 61/22 210/504 |
| 7,581,649 | B2 * | 9/2009 | Ben-Hohn | B01D 29/70 210/488 |
| 7,767,173 | B2 * | 8/2010 | Hamano | B01D 29/46 422/273 |
| 7,913,855 | B2 * | 3/2011 | Ros Roca | B01D 29/70 210/488 |
| 7,985,343 | B2 * | 7/2011 | Haldopoulos | B01D 25/26 95/286 |
| 8,795,694 | B2 | 8/2014 | Super et al. | |
| 9,022,225 | B2 * | 5/2015 | Moriya | B01D 69/10 210/255 |
| 9,895,634 | B2 * | 2/2018 | Selwyn | B01D 29/46 |
| 10,029,280 | B2 * | 7/2018 | Hung | B07B 1/4609 |
| 11,400,393 | B2 * | 8/2022 | Dedul | B01D 29/413 |
| 2002/0060182 | A1 * | 5/2002 | O'Connell | B01D 29/46 210/443 |
| 2004/0108264 | A1 * | 6/2004 | Hajek | B01D 29/35 210/488 |
| 2006/0032200 | A1 * | 2/2006 | Karlebratt | B01D 29/46 55/490 |
| 2007/0029249 | A1 * | 2/2007 | Ben-Hohn | B01D 29/70 210/488 |
| 2007/0095742 | A1 * | 5/2007 | Ruskin | B01D 29/46 210/791 |
| 2007/0119313 | A1 * | 5/2007 | Hamano | B01D 29/46 100/117 |
| 2008/0272068 | A1 * | 11/2008 | Harris | B01D 29/46 210/791 |
| 2008/0308485 | A1 * | 12/2008 | Bagci | B01D 29/54 210/323.2 |
| 2009/0026124 | A1 * | 1/2009 | Schmitz | B01D 29/46 210/231 |
| 2009/0120866 | A1 * | 5/2009 | Ros Roca | B01D 29/66 210/411 |
| 2009/0184064 | A1 * | 7/2009 | Zaiter | B01D 29/114 210/170.01 |
| 2012/0205306 | A1 * | 8/2012 | Reich | B01D 61/18 210/519 |
| 2012/0211441 | A1 * | 8/2012 | Harris | B01D 29/46 210/780 |
| 2013/0008848 | A1 * | 1/2013 | Jonsson | B01D 29/46 210/488 |
| 2013/0062268 | A1 * | 3/2013 | Kaneko | B30B 9/12 210/228 |
| 2013/0213901 | A1 * | 8/2013 | Harris | B01D 29/46 210/488 |
| 2014/0008290 | A1 * | 1/2014 | Moriya | B01D 39/16 210/489 |
| 2015/0122723 | A1 * | 5/2015 | Orlans | B01D 29/70 210/411 |
| 2015/0144546 | A1 * | 5/2015 | Iwasaki | B01D 29/46 210/236 |
| 2015/0367261 | A1 * | 12/2015 | Calleri | B01D 29/6476 210/403 |
| 2016/0236120 | A1 * | 8/2016 | Richardson | B01D 29/46 |
| 2017/0282099 | A1 * | 10/2017 | Park | B01D 29/46 |
| 2018/0093210 | A1 * | 4/2018 | Schmieder | B01D 29/46 |
| 2018/0161705 | A1 * | 6/2018 | Hemstock | B01D 29/925 |
| 2018/0161819 | A1 * | 6/2018 | Hung | B07B 1/4609 |
| 2018/0345180 | A1 * | 12/2018 | Hemstock | B01D 29/46 |
| 2020/0122063 | A1 * | 4/2020 | Richardson | B01D 29/46 |
| 2021/0046407 | A1 * | 2/2021 | Dedul | B01D 29/413 |
| 2021/0332687 | A1 * | 10/2021 | Knestel | B01D 46/406 |
| 2022/0049585 | A1 * | 2/2022 | Meschke | E21B 43/086 |
| 2022/0054984 | A1 * | 2/2022 | Hemstock | B01D 63/084 |
| 2022/0203272 | A1 * | 6/2022 | Hong | B01D 29/46 |

FOREIGN PATENT DOCUMENTS

| | | |
|---|---|---|
| TW | M372763 U | 1/2010 |
| TW | I687258 B | 3/2020 |
| TW | I699233 B | 7/2020 |

* cited by examiner

TANGENTIAL FLOW FILTRATION MODULE AND TANGENTIAL FLOW FILTRATION ASSEMBLY

BACKGROUND

Field of Invention

The present invention relates to a filtration module and its application. More particularly, the present invention relates to a tangential flow filtration module and a tangential flow filtration assembly using the tangential flow filtration module.

Description of Related Art

In recent years, the production and application of microparticles have become widespread, and a basic requirement for the application of microparticles is the uniformity of particle size. Therefore, a sieve is usually used to sieve the microparticles to obtain microparticles having similar sizes.

However, current sieves are usually made by weaving, such that the sizes of the micropores cannot be controlled, thus resulting in poor precision. Furthermore, the micropores of the sieves are often blocked after being used for a period of time, which seriously affects the sieving effect.

SUMMARY

The invention provides a tangential flow filtration module and a tangential flow filtration assembly using the tangential flow filtration module, which can improve the filtration accuracy and efficiency of the microparticles.

According to the aforementioned object, a tangential flow filtration module is provided. The tangential flow filtration module includes plural plate units serially connected in sequence. Each of the plate units includes a main body, a first combing portion, a second combing portion, a first flange and a second flange. The main body has a first side surface, a second side surface and a through hole, in which the first side surface is opposite to the second side surface, and the through hole extends from the first side surface to the second side surface. The first combing portion and the second combing portion are convexly disposed on the first side surface and the second side surface respectively. The first flange and the second flange respectively protrude from the first side surface and the second side surface and respectively surround the through hole. The first combing portion of one of the plate units is combined with the second combing portion of another one of the plate units adjacent to the one of the plate units, so that a sieving structure is formed by the first flange of the one of the plate units and the second flange of the another one of the plate units adjacent to the one of the plate units.

According to an embodiment of the present invention, the first flange has a first outer surface, and the first outer surface extends from the first side surface to a top edge of the first flange towards a central axis of the through hole. The second flange has a second outer surface, and the second outer surface extends from the second side surface to a top edge of the second flange towards the central axis of the through hole. The first outer surface of first flange of one of the plate units and the second outer surface of the second flange of another one of the plate units which is adjacent to the one of the plate units together form the sieving structure having a gradual width.

According to an embodiment of the present invention, there is a first height difference between the first combing portion and the first flange, and there is a second height difference between the second combing portion and the second flange. The first height difference and the second height difference together form an opening width of the sieving structure.

According to an embodiment of the present invention, a surface of each of the plate units is plated with a hydrophobic film or a smooth film.

According to an embodiment of the present invention, the tangential flow filtration module further includes a first joint unit and a second joint unit, and the first joint unit and the second joint unit respectively includes a connecting body, a tube portion and a combing portion. The connecting body has an outer side surface, an inner side surface and a communicating hole, in which the outer side surface is opposite to the inner side surface, and the communicating hole extends from the outer side surface to the inner side surface. The tube portion is disposed on the outer side surface and communicated with the communicating hole. The combing portion is convexly disposed on the inner side surface. The first joint unit is combined with the second combing portion of a first one of the plate units, and the second joint unit is combined with the first combing portion of a last one of the plate units.

According to an embodiment of the present invention, the first joint unit and the second joint unit respectively includes a convex edge, and the convex edge protrudes from the inner side surface and surrounds the communicating hole. The convex edge of the first joint unit and the second flange of the first one of the plate units together form another sieving structure, and the convex edge of the second joint unit of the last one of the plate units together form still another sieving structure.

According to an embodiment of the present invention, the tangential flow filtration module further includes plural elastic members respectively disposed between any two adjacent plate units.

According to the aforementioned object, a tangential flow filtration module is provided. The tangential flow filtration module includes the aforementioned tangential flow filtration module and an outer tube. The outer tube has a first end, a second end opposite to the first end, and an accommodating space, in which the tangential flow filtration module is disposed in the accommodating space, and the tube portion of the first joint unit extends outside the first end, and the tube portion of the second joint unit extends outside the second end. When liquid to be filtered flows from the tube portion of the first joint unit through the through holes of the plate units and further flows to the tube portion of the second joint unit, microparticles in the liquid to be filtered which are smaller than the size of the sieving structures will pass through the sieving structures to enter the accommodating space.

According to an embodiment of the present invention, the first flange has a first outer surface, and the first outer surface extends from the first side surface to a top edge of the first flange towards a central axis of the through hole. The second flange has a second outer surface, and the second outer surface extends from the second side surface to a top edge of the second flange towards the central axis of the through hole. The first outer surface of first flange of one of the plate units and the second outer surface of the second flange of another one of the plate units which is adjacent to the one of the plate units together form the sieving structure having a gradual width.

According to an embodiment of the present invention, there is a first height difference between the first combing portion and the first flange of each of the plate units. There is a second height difference between the second combing portion and the second flange of each of the plate units. The first height difference and the second height difference together form an opening width of the sieving structure.

According to an embodiment of the present invention, surfaces of each of the plate units are plated with a hydrophobic film or a smooth film.

According to the aforementioned embodiments of the present disclosure, the plate units are modularized to be easily stacked to form a liquid flow channel and a sieving structure, and the stacked plate units can be cooperated with a pipeline and a pressure pump so as to sieve the microparticles in a circulating way. On the other hand, by assembling the plate units to form the sieving structure can facilitate the control of the sieving size of the sieving structure so as to improve the overall sieving accuracy. In addition, modularized plate units not only can be easily mass produced, but also easy to assemble and disassemble, thereby achieving the advantages of easy cleaning and maintenance.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
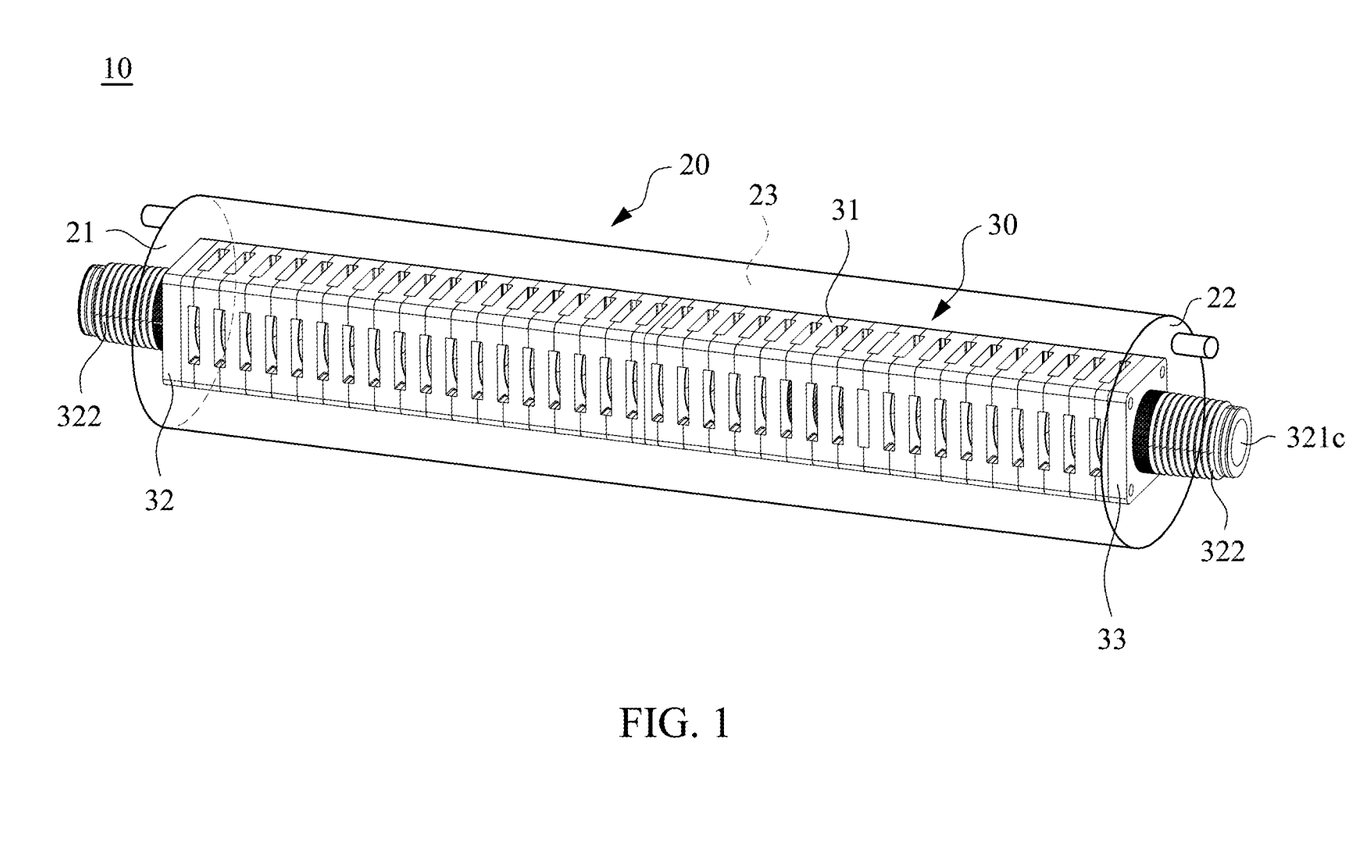
FIG. 1 is a schematic diagram showing a tangential flow filtration assembly in accordance with an embodiment of the present invention.

Referring to FIG. 1, FIG. 1 is a schematic diagram showing a tangential flow filtration assembly 10 in accordance with an embodiment of the present invention. The tangential flow filtration assembly 10 of the present embodiment mainly includes an outer tube 20 and a tangential flow filtration module 30. The outer tube 20 has a first end 21, a second end 22 and an accommodating space 23. The first end 21 is opposite to second end 22, and the accommodating space 23 is an inner space of the outer tube 20. The tangential flow filtration module 30 is disposed in the accommodating space 23 of the outer tube 20, and the outer tube 20 is configured to receive the liquid filtered by the tangential flow filtration module 30.

Figure 2:
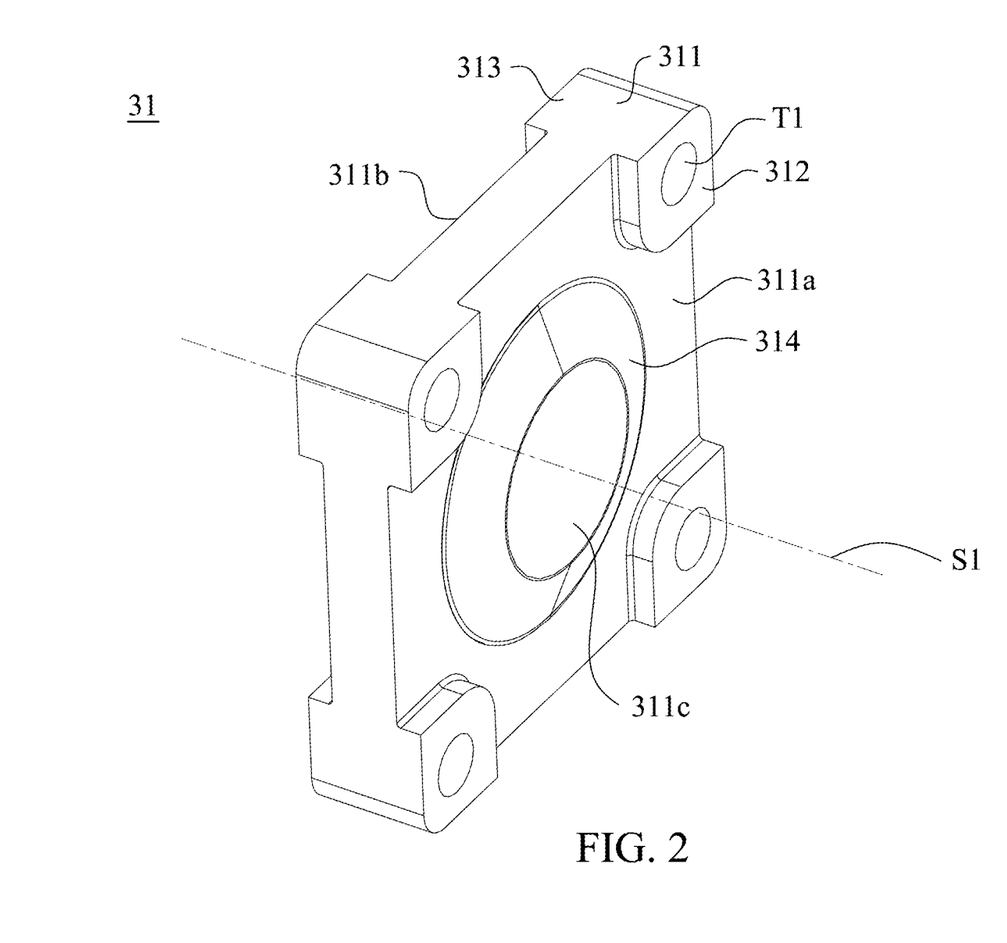
FIG. 2 is a schematic structural diagram showing a plate unit in accordance with an embodiment of the present invention.
Figure 3:
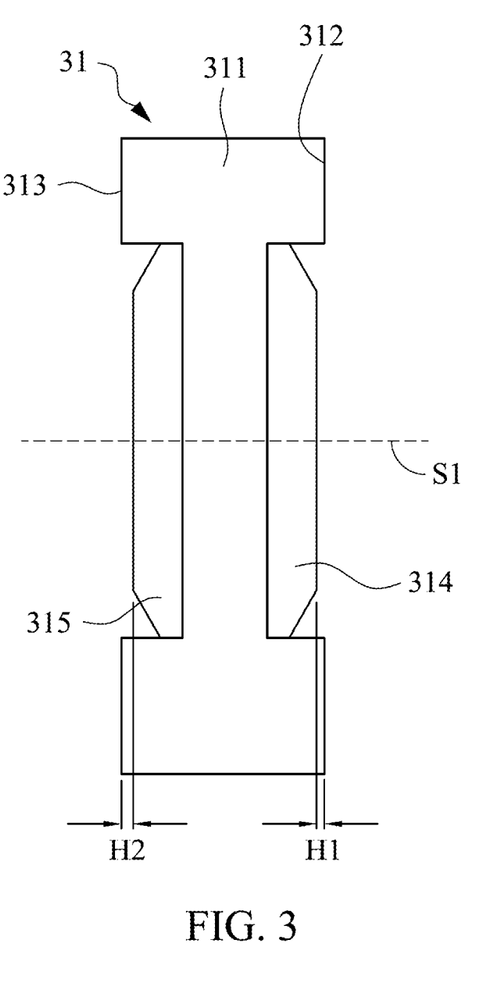
FIG. 3 is a schematic side view of the plate unit in accordance with an embodiment of the present invention.

Simultaneously referring to FIG. 2 and FIG. 3, FIG. 2 is a schematic structural diagram showing a plate unit in accordance with an embodiment of the present invention, and FIG. 3 is a schematic side view of the plate unit in accordance with an embodiment of the present invention. The tangential flow filtration module 30 of the present embodiment includes plural plate units 31 serially connected in sequence. Each of the plate units 31 includes a main body 311, a first combing portion 312, a second combing portion 313, a first flange 314 and a second flange 315. The main body 311 has a first side surface 311a, a second side surface 311b and a through hole 311c. The first side surface 311a is opposite to the second side surface 311b, and the through hole 311c extends from the first side surface 311a to the second side surface 311b.

As shown in FIG. 2 and FIG. 3, the first combing portion 312 is convexly disposed on the first side surface 311a. More specifically, the first combing portion 312 consists of four bumps respectively protruding from four corners of the first side surface 311a. The first flange 314 protrudes from the first side surface 311a, and surrounds the through hole 311c. Similarly, the second combing portion 313 is convexly disposed on the second side surface 311b. More specifically, second combing portion 313 consists of four bumps respectively protruding from four corners of the second side surface 311b. The second flange 315 protrudes from the second side surface 311b, and surrounds the through hole 311c. In one embodiment, a protrusion height of the first flange 314 is slightly lower than a protrusion height of the first combing portion 312, and there is a first height difference H1 between the first flange 314 and the first combing portion 312. Similarly, a protrusion height of the second flange 315 is slightly lower than a protrusion height of the second combing portion 313, and there is a second height difference H2 between the second combing portion 313 and the second flange 315. Therefore, when the plate units 31 are connected in series, as shown in FIG. 3 and FIG. 5, the first combing portion 312 of one of the plate units 31 and the second combing portion 313 of another one of the plate units 31 which is adjacent to the one of the plate units 31 abut against each other, so that the first flange 314 of one of the plate units 31 and the second flange 315 of the adjacent plate unit 31 together form a sieving structure A1, such that an opening width of the sieving structure A1 can be formed by the first height difference H1 of one of the plate units 31 and the second height difference H2 of the adjacent plate unit 31.

In some embodiments, the plate units, or the plate units, the first joint unit 32 and the second joint unit 33, can be connected to each other by a fastening rod (not shown), and by adjusting the pressing tightness exerted by the plate units 31 against each other, the opening width of the sieving structure A1 can be fine-tuned to precisely control the size of the microparticles to be filtered. In one embodiment, adjusting the pressing tightness between the plate units 31 can be achieved by the material deformation of the plate units 31. In other embodiment, elastic members (now shown) can be disposed between any two adjacent plate units 31 to adjust the pressing tightness between the plate units 31. More specifically, one end of the elastic member is abutted against the first combing portion 312 of one of two adjacent plate units 31, and the other end of the elastic member is abutted against the second combing portion of the other one of two adjacent plate units 31. By the compression or stretch of the elastic member, the distance between two adjacent plate units 31 can be changed to achieve the purpose of adjusting the opening width of the sieving structure A1. In some examples, the elastic members may be a spring, a rubber or an elastic sheet, and is not limited thereto.

Figure 5:
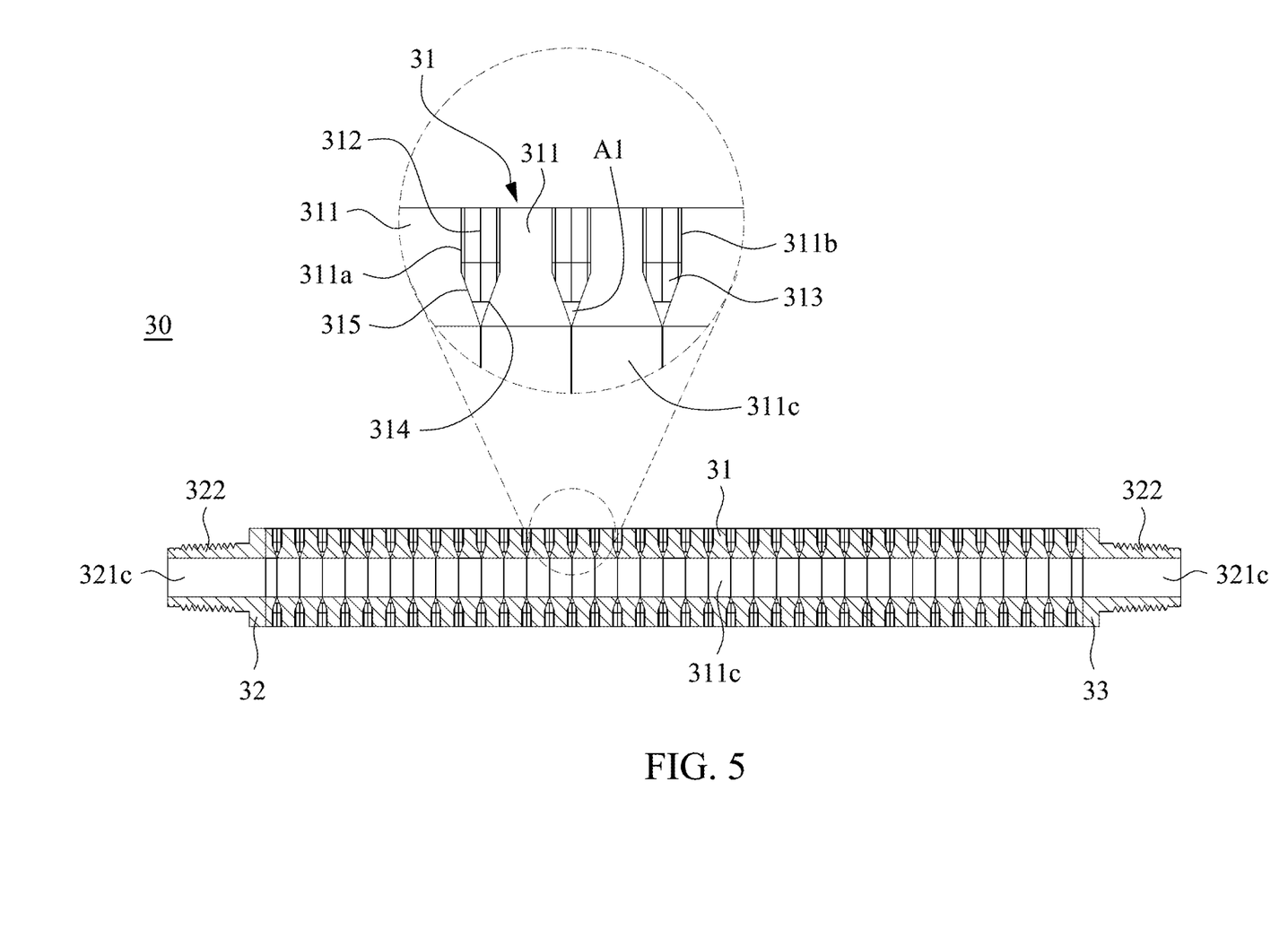
FIG. 5 is a cross-sectional view showing a tangential flow filtration module in accordance with an embodiment of the present invention.

In one embodiment, as shown in FIG. 2 and FIG. 5, in order to stabilize the adjustment process of the opening width of the sieving structure A1, each of the plate unit 31 is set with a through hole T1 that penetrates the main body 311 to communicate the first combing portion 312 with the second combing portion 313. The fastening rod can be inserted into each through holes T1 of the plate unit 31 to connect the plate unit 31 together. In other embodiments, the elastic members can be sleeved on the fastening rod to prevent from being loosened. In some embodiments, the fastening rod has a thread. The thread can be a continuous thread or a discontinuous thread. Continuous thread means that the threaded portions on the fastening rod are connected to each other. Two nuts are respectively screwed on a starting end and an ending end of the continuous thread, and the widths of all sieving structures A1 can be adjusted at one time by moving the plate units 31 at the starting end and the ending end of the continuous thread. In addition, discontinuous thread means that the threaded portions on the fastening rod are not connected to each other. Two nuts are screwed on the discontinuous thread, and the widths of all sieving structures A1 can be adjusted at one time by moving the plate units 31 between the two nuts. In one example, the fastening rod can be a screw or other fasteners.

Referring to FIG. 2, FIG. 3 and FIG. 5, in one embodiment, the first flange 314 has a first outer surface, and the first outer surface is an inclined surface that extends from the first side surface 311a to a top edge of the first flange 314 towards the central axis S1 of the through hole 311c. The second flange 315 has a second outer surface, and the second outer surface is an inclined surface that extends from the second side surface 311 to a top edge of the second flange 315 towards the central axis S1 of the through hole 311c. Moreover, the first flange 314 and the second flange 315 respectively surround the through hole 311c so as to form a crater-shaped structure. Therefore, when plural plate units 31 are connected together, as shown in FIG. 3, the first outer surface of first flange 314 of one of the plate units 31 and the second outer surface of the second flange 315 of another one of the plate units 31 adjacent to the one of the plate units 31 together form the sieving structure A1 which has a gradual width. More specifically, the width of the sieving structure A1 increases from one end near through hole 311c to the other end away from the through hole 311c (as shown in FIG. 5). Therefore, when plural plate units 31 are connected in series, the through holes 311c of the plate units 31 are together formed a flow channel. When the liquid to be filtered flows along an arrangement direction of the plate units 31 and passes through these through holes 311c, the microparticles in the liquid to be filtered that are smaller than the opening width of the sieving structure A1 will follow along a direction which is perpendicular to the arrangement direction of the plate units 31 to pass through the sieving structure A1, thereby achieving the purpose of filtering the microparticles with a specific size. Moreover, because the sieving structure A1 has a gradual width design, in addition to reducing the friction between the microparticles and the sieving structures A1, it can also generate a pressure difference in the fluid to increase the flow rate of microparticles while passing through the sieving structures A1.

Figure 4:
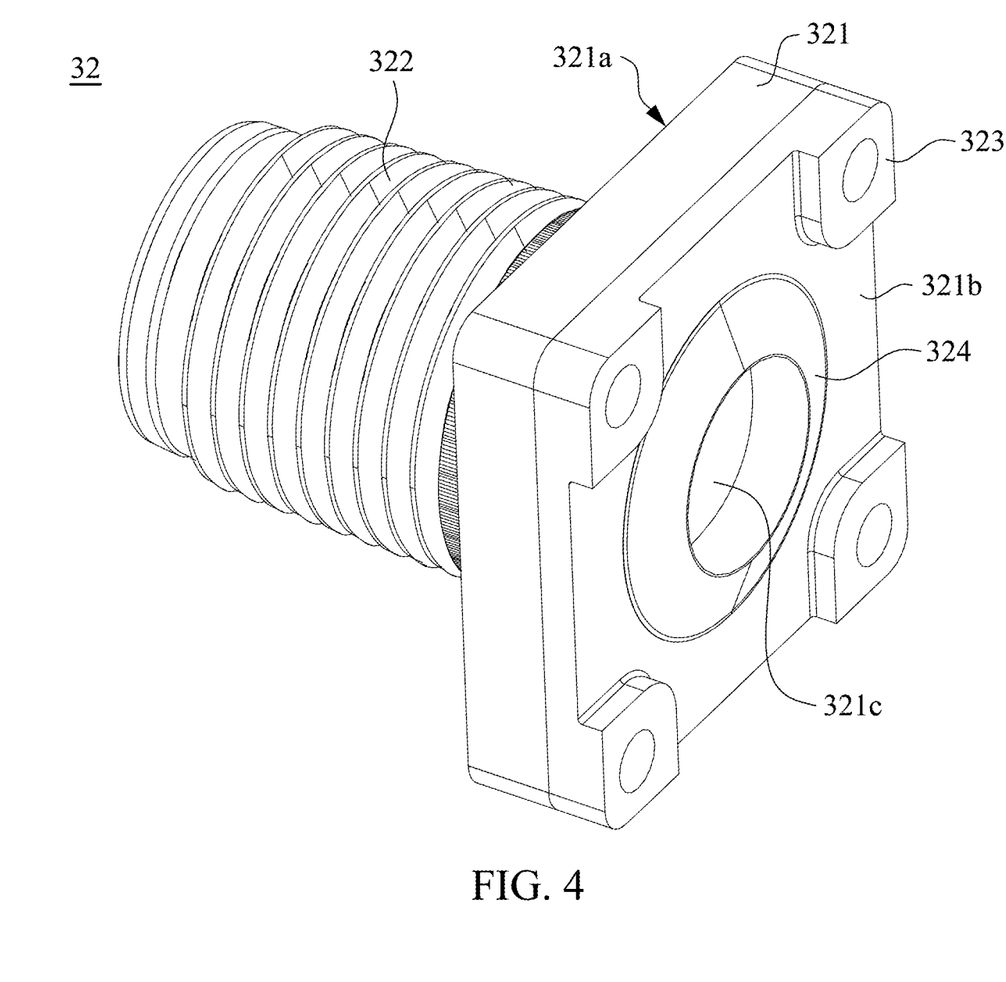
FIG. 4 is a schematic structural diagram showing a first joint unit in accordance with an embodiment of the present invention.

Referring to FIG. 1 and FIG. 4, FIG. 4 is a schematic structural diagram showing a first joint unit in accordance with an embodiment of the present invention. In one embodiment, the tangential flow filtration module 30 further includes a first joint unit 32 and a second joint unit 33. The first joint unit 32 is connected to a first one of the plate units 31 which are connected in sequence, and the second joint unit 33 is connected to a last one of the plate units 31 which are connected in sequence. As shown in FIG. 4, the first joint unit 32 includes a connecting body 321, a tube portion 322, a combing portion 323 and a convex edge 324. The connecting body 321 has an outer side surface 321a, an inner side surface 321b and a communicating hole 321c. The outer side surface 321a is opposite to the inner side surface 321b, and the communicating hole 321c extends from the outer side surface 321a to the inner side surface 321b. The tube portion 322 is disposed on the outer side surface 321a, and communicates with the communicating hole 321c. The combing portion 323 is convexly disposed on the inner side surface 321b. More specifically, the combing portion 323 consists of four bumps respectively protruding from four corners of the inner side surface 321b. The convex edge 324 protrudes from the inner side surface 321b, and surrounds the communicating hole 321c. In one embodiment, a protrusion height of the combing portion 3234 is slightly higher than a protrusion height of the convex edge 3242. It is noted that, the structure of the second joint unit 33 is similar to the structure of the first joint unit 32, and therefore will not be described again herein.

As shown in FIG. 1, FIG. 3 and FIG. 4, when the first joint unit 32 is connected to the first one of the plate units 31, the combing portion 323 of the first joint unit 32 is abutted against the second combing portion 313 of the first one of the plate units 31, so that the convex edge 324 of the first joint unit 32 and the second flange 315 of the first one of the plate unit 31 can together form a sieving structure. Similarly, when the second joint unit 33 is connected to the last one of the plate units 31, the combing portion 323 of the second joint unit 33 is abutted against the first combing portion 312 of the last one of the plate units 31, so that the convex edge 324 of the second joint unit 33 and the first flange 314 of the last one of the plate unit 31 also can together form a sieving structure.

Referring to FIG. 1 and FIG. 5, FIG. 5 is a cross-sectional view showing the tangential flow filtration module 30 in accordance with an embodiment of the present invention. In one embodiment, when the tangential flow filtration module 30 is disposed in the accommodating space 23 of the outer tube 20, the tube portion 322 of the first joint unit 32 extends outside the first end 21 of the outer tube 20, and the tube portion 322 of the second joint unit 33 extends outside the second end 22 of the outer tube 20. Therefore, when the liquid to be filtered flows from the tube portion 322 of the first joint unit 32, passes through the through holes 311c of the plate units 31 and further flows to the tube portion 322 of the second joint unit 33, the microparticles in the liquid to be filtered which are smaller than the size of the sieving structure A1 will pass through the sieving structure A1 and enter the accommodating space 23, thereby achieving the purpose of filtering different sizes of the microparticles from the liquid to be filtered.

In some embodiments, each of the plate units 31 is plated with a hydrophobic film or a smooth film.

According to the aforementioned embodiments of the present disclosure, the plate units are modularized to be easily stacked to form a liquid flow channel and a sieving structure, and the stacked plate units can be cooperated with a pipeline and a pressure pump so as to sieve the microparticles in a circulating way. On the other hand, by assembling the plate units to form the sieving structure can facilitate the control of the sieving size of the sieving structure so as to improve the overall sieving accuracy. In addition, modularized plate units not only can be easily mass produced, but also easy to assemble and disassemble, thereby achieving the advantages of easy cleaning and maintenance.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tangential flow filtration module comprising:
a plurality of plates, each plate including:
  a first side surface;
  a second side surface;
  a through hole extending from said first side surface to said second side surface;
  at least two orthogonal projections equidistantly extending from each first and second side surface;
  a first tapered flange protruding from each first side surface and surrounding the through hole;
  a second tapered flange extending from each second side surface and surrounding the through hole;
  wherein the at least two orthogonal projections equidistantly extend from the first and second side surfaces further than the first and second tapered flanges extend from the first and second side surfaces, said plurality of plates being stacked such that the orthogonal projections of one plate engage corresponding orthogonal projections of each adjacent stacked plate, defining a gap between the first side surface of a first plate and a side surface of an adjacent stacked plate, and a sieve dimension defined by the distance between the uppermost portion of the first tapered flange of the first plate and the uppermost portion of the tapered flange of the adjacent stacked plate, which is less than the dimension of the gap, with fluid and particles of less than the sieve dimension passing into an interior volume of the tangential flow filtration module.

2. The tangential flow filtration module of claim 1, wherein, a surface of each plate is coated with a film.

3. The tangential flow filtration module of claim 2, wherein, the film is hydrophobic.

4. The tangential flow filtration module of claim 1, further comprising a plurality of elastic members disposed between each plate.

5. The tangential flow filtration module of claim 1, wherein, each plate is substantially square.

6. The tangential flow filtration module of claim 5, wherein, four orthogonal projections equidistantly extend from each corner of each first and second side surface of each substantially square plate.

7. The tangential flow filtration module of claim 1, further comprising first and second end plates each having an end plate through hole and a tube connected to each end plate and in fluid communication with the respective end plate through hole.

8. A tangential flow filtration assembly comprising
a housing; and
a tangential flow filtration module of claim 7 disposed within the housing, with the tubes of each end plate placing the interior volume of the tangential flow filtration module in fluid communication with an exterior of the housing.

9. The tangential flow filtration assembly of claim 8, wherein, the housing is cylindrical.

* * * * *